(12) United States Patent
Schneider et al.

(10) Patent No.: US 8,191,122 B2
(45) Date of Patent: *May 29, 2012

(54) PROVISIONING A NETWORK APPLIANCE

(75) Inventors: James P. Schneider, Raleigh, NC (US);
Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 1218 days.

This patent is subject to a terminal disclaimer.

(21) Appl. No.: 11/998,097

(22) Filed: Nov. 27, 2007

(65) Prior Publication Data

US 2009/0138946 A1 May 28, 2009

(51) Int. Cl.
*G06F 21/00* (2006.01)

(52) U.S. Cl. ........................................... 726/5; 713/156

(58) Field of Classification Search ................ 726/5, 10; 713/2, 155, 156, 175, 178
See application file for complete search history.

(56) References Cited

U.S. PATENT DOCUMENTS

| | | | |
|---|---|---|---|
| 5,872,966 A | 2/1999 | Burg | |
| 6,144,965 A | 11/2000 | Oliver | |
| 6,212,563 B1 | 4/2001 | Beser | |
| 6,721,733 B2 | 4/2004 | Lipson et al. | |
| 6,847,959 B1 | 1/2005 | Arrouye et al. | |
| 6,996,832 B2 | 2/2006 | Gunduc et al. | |
| 7,003,527 B1 | 2/2006 | Lavallee et al. | |
| 7,254,814 B1 | 8/2007 | Cormier et al. | |
| 7,509,638 B2 | 3/2009 | Backhouse et al. | |
| 7,568,095 B2 * | 7/2009 | Thornton et al. | 713/156 |
| 7,650,397 B2 | 1/2010 | Price et al. | |
| 7,673,143 B1 | 3/2010 | Yeager et al. | |
| 7,707,405 B1 | 4/2010 | Gilman et al. | |
| 2001/0028647 A1 * | 10/2001 | Teraoka | 370/389 |
| 2002/0116453 A1 | 8/2002 | Todorov et al. | |
| 2003/0037237 A1 * | 2/2003 | Abgrall et al. | 713/166 |
| 2003/0158957 A1 | 8/2003 | Abdolsalehi | |
| 2004/0068586 A1 | 4/2004 | Xie et al. | |
| 2004/0093499 A1 * | 5/2004 | Arditi et al. | 713/176 |
| 2004/0148185 A1 | 7/2004 | Sadiq | |
| 2005/0033794 A1 | 2/2005 | Aridor et al. | |
| 2005/0125411 A1 | 6/2005 | Killian et al. | |
| 2005/0235352 A1 * | 10/2005 | Staats et al. | 726/14 |
| 2006/0004689 A1 | 1/2006 | Chandrasekaran et al. | |
| 2006/0059111 A1 | 3/2006 | Tucker et al. | |
| 2006/0074975 A1 | 4/2006 | Tunar et al. | |
| 2007/0074119 A1 | 3/2007 | Komine et al. | |

(Continued)

OTHER PUBLICATIONS

Kaufman et al. "Network Security: Private Communication in a Public World", second edition, Prentice Hall Series in Computer Networking and Distributed Systems, 2002, pp. 311-313, ISBN: 0-13-046019-2.*

(Continued)

*Primary Examiner* — Hadi Armouche
(74) *Attorney, Agent, or Firm* — Lowenstein Sandler PC (57) ABSTRACT

A method and system for generating identity certificates. The method may include receiving a user login at a network appliance, determining that the network appliance is not initialized, and requesting and receiving a unique identifier from a service provider, where the unique identifier is used for identifying the network appliance. The method may include generating a certificate signing request (CSR) and sending the CSR with the unique identifier to the service provider. Upon receiving a signed certificate from the service provider at the network appliance, the network appliance is initialized using the received signed certificate.

19 Claims, 6 Drawing Sheets

U.S. PATENT DOCUMENTS

| | | | |
|---|---|---|---|
| 2007/0100965 | A1 | 5/2007 | Schweier |
| 2008/0004887 | A1 | 1/2008 | Brunswig et al. |
| 2008/0022103 | A1* | 1/2008 | Brown et al. ............... 713/175 |
| 2008/0071796 | A1 | 3/2008 | Ghuneim et al. |
| 2008/0092234 | A1 | 4/2008 | Cirenis |
| 2008/0114770 | A1 | 5/2008 | Chen et al. |
| 2008/0189651 | A1 | 8/2008 | Reveman |
| 2008/0235710 | A1 | 9/2008 | Challenger et al. |
| 2008/0307508 | A1* | 12/2008 | Conley et al. ................ 726/4 |
| 2009/0031410 | A1* | 1/2009 | Schneider et al. ............ 726/10 |
| 2009/0064127 | A1* | 3/2009 | Schneider ................ 717/170 |
| 2009/0100512 | A1* | 4/2009 | Schneider ................ 726/10 |
| 2009/0132681 | A1* | 5/2009 | Schneider ................ 709/219 |
| 2009/0138946 | A1 | 5/2009 | Schneider et al. |
| 2009/0138947 | A1* | 5/2009 | Schneider et al. ........... 726/5 |
| 2009/0144399 | A1* | 6/2009 | Schneider ................ 709/220 |

OTHER PUBLICATIONS

Red Hat Command Center 3.18, Check Reference, Red Hat, Inc., 2007, 178 pages.

Red Hat Command Center, Users Guide 3.18, Red Hat, Inc., 2007, 318 pages.

Red Hat Command Center, Release Notes 3.18, Red Hat, Inc., 2007, 7 pages.

Red Hat Command Center 3.18, Setup and Installation Guide, Red Hat, Inc., 2007, 33 pages.

Woods, Will. "git://git.fedorahosted.org/snake/commitdiff", http://git.fedorahosted.org/git/snake?p;=snake;a=commitdiff;h=a2cb4fcae9531e22d2fa3d... Aug. 22, 2007, 2 pages.

Office Action of U.S. Appl. No. 11/880,806 mailed Oct. 13, 2010.

Office Action of U.S. Appl. No. 11/985,669 mailed Apr. 1, 2010.

Office Action of U.S. Appl. No. 11/985,669 mailed Sep. 29, 2009.

Office Action of U.S. Appl. No. 11/998,098 mailed Mar. 24, 2011.

Dubash, Manek, techworld.com, Yahoo News, PC World.com, Red Hat posts Command Center, May 29, 2007, 1 pages.

Red Hat, Red Hat Command Center: Easy effective, affordable systems monitoring, www.redhat.com, 2007, 2 pages.

* cited by examiner

PROVISIONING A NETWORK APPLIANCE

TECHNICAL FIELD

Embodiments of the present invention relate to authentication mechanisms for network devices, and more specifically to generation of identity certificates for network devices and activation of network appliances.

BACKGROUND

Networked computers are used to transmit and fetch information to and from local sources (e.g., computers used in a business) and remote sources (e.g., enterprise services offered over the internet). To ensure privacy and security during communication between networked computers, authentication and verification mechanisms may be used. One such mechanism is a public key infrastructure system, in which networked devices use signed identity certificates for authentication and/or verification purposes.

In public key infrastructure systems, a certificate signing request (CSR) is a message sent from an applicant to a certificate authority in order to apply for a signed identity certificate. Before creating a CSR, the applicant first generates a key pair (including a public key and a private key), keeping the private key secret. The CSR contains information identifying the applicant (such as a distinguished name of the subject in the case of an X.509 certificate), and the public key generated by the applicant. The identifying information is commonly entered manually by a user. In conventional systems, the CSR is also accompanied by credentials or proofs of identity. Moreover, the certificate authority may contact the applicant for further information. If the request is successful (e.g., if the identifying information, credentials and proofs of identity are satisfactory), the certificate authority will send back an identity certificate (also known as a digital certificate, signed certificate, public key certificate, etc.) that has been digitally signed with the private key of the certificate authority. This identity certificate may thereafter be used by the applicant to authenticate and/or verify itself to networked devices that trust the certificate authority.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for generating identity certificates with minimal user input. In one embodiment, a user provides login information to the network appliance. The network appliance establishes a session with a back end server (such as a server hosted by a service provider) by providing user login credentials that are given by the logged in user. The network appliance notifies the back end server that the network appliance needs a unique identifier, which the back end server sends to the network appliance (if an identifier is available and/or authorized for example). The network appliance embeds the unique identifier into a certificate signing request (CSR) and presents the CSR to the back end server. The back end server validates the CSR and identifier, signs the CSR, generates and signs a certificate, and transfers the certificate to the network appliance. The network appliance installs the certificate.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The description that follows details a system, apparatus, and method for generating identity certificates for devices with minimal user input. Such identity certificates may be generated without a user providing or knowing information about the device (such as configuration information, credential information of the device, identifying information of the device, etc.). Therefore, the device may be activated, configured and/or authenticated by a user without the user even being aware of the identity certificate process. In one embodiment, to initiate generation of the identity certificate, a user may log into a network appliance, and the network appliance negotiates with a back end server for the identity certificate without further input from the user.

The automated nature of the activation, configuration and authentication in embodiments of the present invention may reduce the occurrence of user error in setting up a network appliance. In conventional methods for example, a user would have to type in the IP address of the device to be activated. In many cases the user would incorrectly type in the IP address, which would stymie the activation of the device. Users, being unaware of the incorrect number being supplied, would often call "tech support" to help in resolving the problem. Additionally, new IP addresses might be assigned to the device before the device is activated, which would also cause terminal errors in the installation process.

Figure 1A:
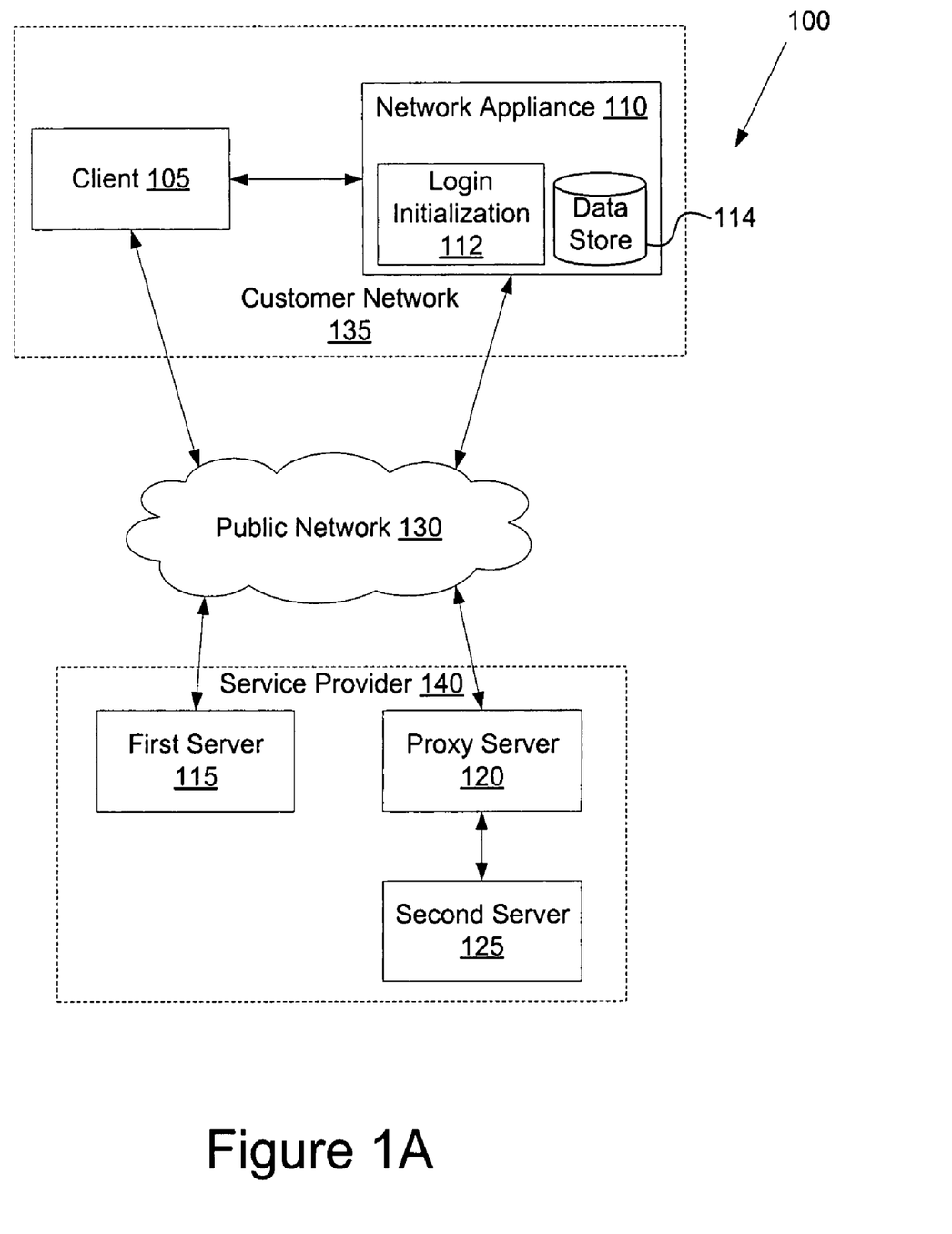
FIG. 1A illustrates an exemplary network architecture in which embodiments of the present invention may operate.

FIG. 1A illustrates an exemplary network architecture 100 in which embodiments of the present invention may operate. The network architecture 100 may include a service provider 140 connected with a customer network 135 (e.g., a local area network (LAN), wide area network (WAN), intranet, etc.) over a public network 130 (e.g., the internet). Alternatively, the customer network 135 may be connected with the service provider 140 via a private network (not shown) (e.g., an intranet, virtual private network (VPN), etc.).

Network architecture 100 may enable service provider 140 to provide services targeted to, and/or dependent on, specific devices (e.g., network appliance 110) of customer network 135. To provide such services, it may be necessary for the specific device to authenticate itself to service provider 140. Such authentication may be achieved using an identity certificate. In one embodiment, the identity certificate is generated as part of activating and/or configuring a new device. Alternatively, generation of the identity certificate may occur separately from device activation and configuration.

Referring to FIG. 1A, the customer network 135 may represent a network of an enterprise and may include such devices as desktop computers, laptop computers, network printers, switches, routers, gateways, firewalls, or any other devices having a network address. In one embodiment, the customer network 135 also includes a client 105 and a network appliance 110. For example, client 105 may be a device operated by an IT administrator or some other user as a user interface to communicate with the network appliance 110, which includes login initialization 112 (for login and initial activation of the network appliance) and data store 114 (for storing certificates). The network appliance 110 may be a computing device that is configurable over a network. In other embodiments, the customer network 135 may include different combinations of clients, network appliances, switches, routers, gateways, etc.

The client 105 and the network appliance 110 may each be a computing device such as, for example, a desktop computer, laptop computer, server, etc. In an example, the network appliance 110 is configured to perform a network related function (e.g., network monitoring) upon connection with the customer network 135. The network related function can be automatically initiated once the network appliance 110 receives an identity certificate and/or configuration information.

In one embodiment, configuration for the network appliance is automatically accomplished when a user logs into the network appliance. The user can supply information and authenticating information such as a username and password, respectively. The network appliance subsequently logs into a back-end server. When the server determines that the network appliance does not have a certificate for communicating with a service provider, the server generates a unique identifier (ID) and sends the unique ID to the network appliance. The network appliance sends the CSR with the unique ID (optionally embedded in the CSR) to the service provider. The service provider evaluates the supplied information, signs the certificate, and sends the signed certificate back to the network appliance, where the network appliance installs the certificate. Thus, the network appliance can be activated without the user being aware of the activation process and with a much-reduced chance of error.

Service provider 140 provides one or more services to customer network 135. In one embodiment, service provider 140 hosts a network and systems management and monitoring tool (NSMMT) that collects information about the customer network 135 and devices on the customer network 135, and presents this information to a user such as an IT administrator (e.g., via client 105). Alternatively, the service provider 140 may provide other services, such as intranet indexing services, etc. The service provider 140 includes one or more servers (e.g., first server 115, proxy server 120, and second server 125). In one embodiment, the service provider 140 includes a separate and distinct first server 115, proxy server 120 and second server 125. In another embodiment, the first server 115 and second server 125 are co-located on a computing device, and no proxy server 120 is present. Alternatively, other server configurations may be implemented (e.g., service provider 140 may include more or fewer servers, which may have redundant or different functionality).

First server 115 may be a front end server that provides an interface to client 105 of customer network 135. Through the first server 115, users of customer network 135 may request data, initiate actions, receive information, etc. Network appliance 110 may also communicate with first server 115, for example, to request a service, initiate an action, report data, etc. In one embodiment, first server 115 is a web application server that provides a web application interface accessible to network appliance 110 via a web browser. The network appliance 110 can use a provisioning URL (or CLI interface, for example) to automatically negotiate a setup script with one or more of service provider 140 servers. The setup can often be accomplished without awareness of the setup process by the user.

Second server 125 may be a back end server that communicates with the network appliance 110 of customer network 135 to send and/or receive such data as identity certificate information, network status updates, transactions, etc. Second server 125 may also communicate data to and/or from client 105. In one embodiment, second server 125 communicates with the network appliance 110 and/or client 105 through proxy server 120. Proxy server 120 receives transmissions and, if appropriate, forwards them to second server 125. Alternatively, no proxy server 120 may be present, or multiple proxy servers may be used.

Figure 1B:
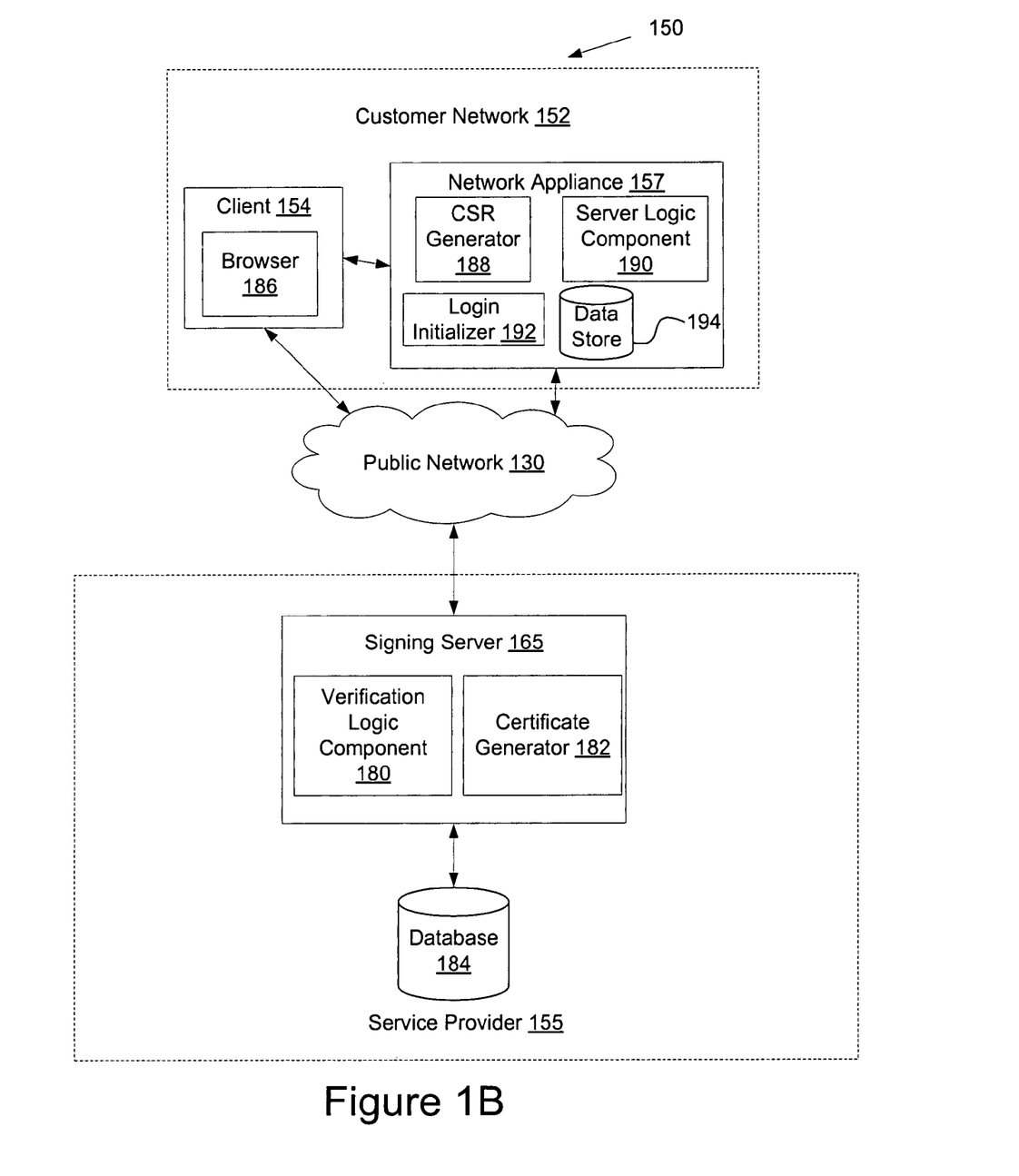
FIG. 1B illustrates another exemplary network architecture, in which further embodiments of the present invention may operate.

FIG. 1B illustrates another exemplary network architecture 150, in which further embodiments of the present invention may operate. The network architecture 150 may include a service provider 155 connected with a customer network 152 over a public network 130 (e.g., the internet) or a private network (not shown).

The customer network 152 may include a client 154 and a network appliance 157. For example, client 154 may be a device operated by an IT administrator or some other user as a user interface to communicate with the network appliance 157. Alternatively, the customer network 152 may include different combinations of clients, network appliances, switches, routers, gateways, and the like.

The client 154 and the network appliance 157 may each be a computing device such as, for example, a desktop computer, laptop computer, server, etc. In one embodiment, client 154 hosts a browser 186. Browser 186 is an application that enables client 154 to display and interact with text, images, and other information provided by a server such as the server logic component 190 of network appliance 157.

Network appliance 157 may include a certificate signing request (CSR) generator 188, a server logic component 190, a login initializer 192, and a data store 194 for storing signed certificates. Server logic component 190 may be a server application that resides on network appliance 157. Server logic component 190 may receive requests (e.g., for web pages, for specified information, to initiate an action, etc.), provide data, and/or perform other server functions. In one embodiment, server logic component 190 presents data in a form navigable by browser 186.

In operation, login initializer 192 receives a user login from a user when the network appliance is to be initialized. A user may have to manually configure the network appliance before provisioning takes place. The provisioning process is ordinarily started by explicit user interaction with the network appliance. When initialization needs to be performed, the login initializer 192 establishes a session with the signing server 165. When the signing server 165 recognizes the credentials supplied by the network appliance, the signing server generates (or selects a pre-generated) unique identifier to send to the network appliance. Upon receipt of the unique identifier, the CSR generator 188 may generate a CSR. Additionally, the CSR generator 188 can be notified upon failure of the signing server 165 to recognize credentials supplied by the network appliance 157.

Generation of a CSR may include generating a public key pair that includes a related public key and private key. Data encrypted with the public key can normally only be decrypted by the private key, and data encrypted with the private key can normally only be decrypted with the public key. The key generation can be performed by the network appliance 157 or by a third party trusted for key generation. Also the network appliance 157 can request a key pair from the signing server 165.

The unique identifier that is provided by the network appliance 157 is normally included with the CSR. The CSR may include additional information such as credential information, information about the network appliance, and the like. The CSR may then be signed by the private key, and sent to a certificate authority (e.g., signing server 165 of service provider 155).

Service provider 155 may include a signing server 165, and a database 184. Signing server 165 may be a back end server that provides identity certificates. Signing server 165 may act as a certificate authority (CA), and provide identity certificates that can be used to authenticate devices (e.g., network appliance 157). In one embodiment, certificates provided by signing server 165 are used to authenticate network appliances to servers that trust signing server 165. In one embodiment, signing server 165 includes a verification logic component 180 and a certificate generator 182.

Certificate generator 182 signs certificate signing requests (CSRs) to generate identity certificates. Before a certificate is generated, verification logic component 180 verifies that a received CSR should be signed. Such a verification includes analyzing the unique identifier provided by network appliance 157 to determine whether the unique identifier is unique from the standpoint of signing server 165. The verification may also include comparing a transaction identifier (e.g., transaction token and/or timestamp) to a CSR, comparing the transaction identifier to a list of valid transaction identifiers, and the like. In one embodiment, a message is generated and transmitted to an originator of the CSR when the "returned" unique identifier is not determined to be valid from the standpoint of signing server 165. If any one of the verification mechanisms fails, the certificate may not be generated.

Figure 2:
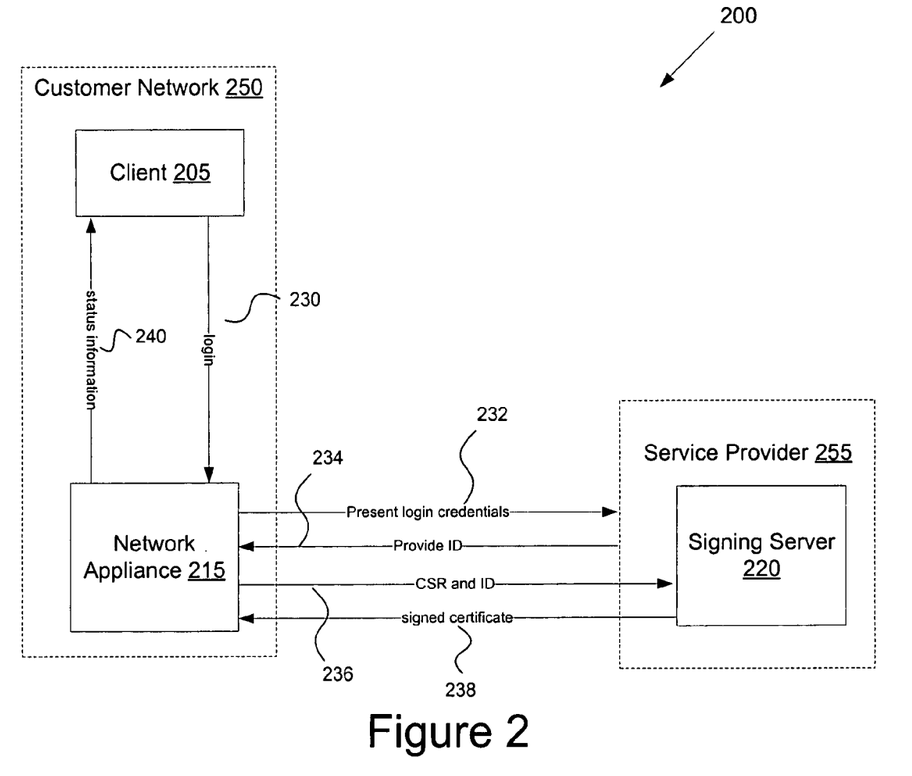
FIG. 2 illustrates a data flow diagram 200 that shows data transmitted between a customer network 250 and a service provider 255, in accordance with one embodiment of the present invention.

FIG. 2 illustrates a data flow diagram 200 that shows data transmitted between a customer network 250 and a service provider 255, in accordance with one embodiment of the present invention. Preferably each transmission is achieved using a secure channel such as, for example, secure sockets layer (SSL), secure hypertext transfer protocol (HTTPS), and the like. Alternatively, an unsecure channel may be used for transmission of, for example, an identity certificate. In one embodiment, the customer network 250 and service provider 255 correspond to customer network 135 and service provider 140 of FIG. 1A. In another embodiment, customer network 250 and service provider 255 correspond to customer network 152 and service provider 155 of FIG. 1B.

Referring to FIG. 2, in a first transmission 235 a user logs in to network appliance 215. The user may login directly to network appliance 215 or login via client 205 as illustrated in the figure (transmission 230). The user typically supplies credentials such as a user name and password combination to gain access to network appliance 215. When network appliance 215 is being initialized, default credentials may be used. Upon receiving the login information, the network appliance starts the "user-free" initialization process.

In response to receiving the login request when being initialized, network appliance 215 presents login credentials in transmission 232. In response, the service provider supplies a unique identifier for network appliance 215 in transmission 234. Network appliance 215 generates a CSR that includes the unique identifier (other information can be included such as the user-entered credentials, a transaction token, and a timestamp). In one embodiment, the CSR is sent by network appliance 215 as transmission 236 to signing server 220. Alternatively, transmission 236 may be sent to a proxy server (not shown) that forwards the transmission to signing server 220. Network appliance 215 may then wait for a response from the signing server 220 that includes an identity certificate, or monitor a location for a posting of the identity certificate (transmission 238).

Signing server 220 may analyze the CSR to determine whether it is genuine, and thus whether an identity certificate should be signed. Such an analysis may include determining the uniqueness and validity of the unique identifier, examining the user credentials, sending a challenge to the network appliance 215 using a public key included in the CSR, and the like. If the CSR is believed to be genuine, signing server 220 signs the identity certificate of network appliance 215.

Once an identity certificate is signed, signing server 220 may send transmission 238 to network appliance 215 that includes the identity certificate. Alternatively, signing server 220 may post the signed identity certificate to a location monitored by network appliance 215. The network appliance

215 may then detect and download the identity certificate. Network appliance 215 may store the identity certificate, and may thereafter use the identity certificate to authenticate itself to one or more servers of service provider 255.

A transmission 240 may then be sent from network appliance 215 to client 205 including status information. The status information may inform client 205 whether the network appliance 215 has been successfully activated and/or whether an identity certificate was successfully installed. In one embodiment, transmission 250 is a web page redirect that redirects the client 205 to a web page. If the certificate was successfully installed, then the redirect may be a redirect to a web page stating that the network appliance 215 was successfully activated. If the certificate was not successfully installed, then the redirect may be a redirect to a web page stating that an error occurred in activation of the network appliance 215.

Figure 3:
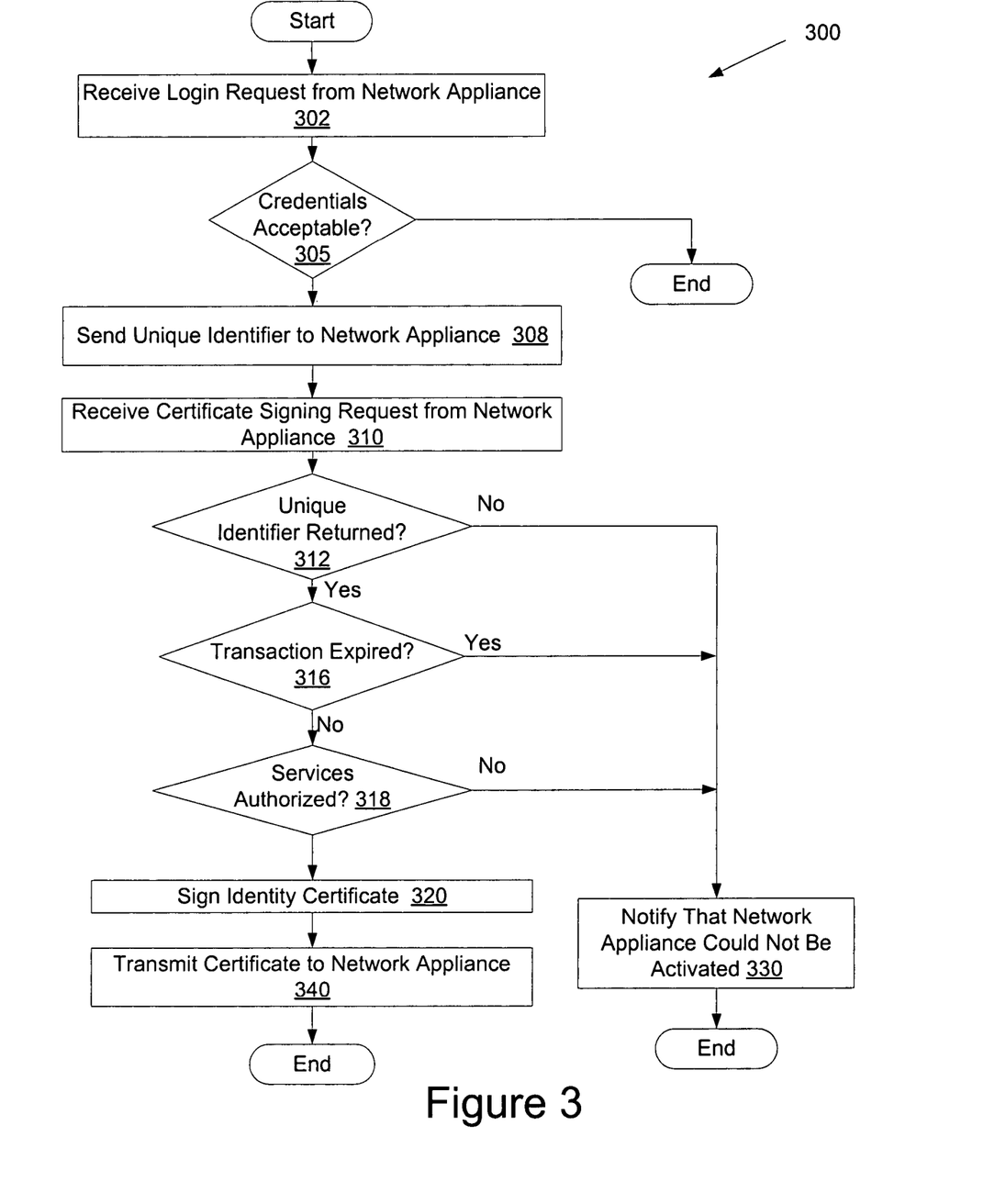
FIG. 3 is a flow diagram illustrating one embodiment of a method for activating a network appliance.

FIG. 3 is a flow diagram illustrating one embodiment of a method 300 for activating a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a service provider, such as service provider 140 of FIG. 1A, service provider 155 of FIG. 1B, or service provider 255 of FIG. 2.

Referring to FIG. 3, method 300 begins with processing logic receiving a login request from a network appliance (block 302) to initialize the network appliance. At block 305, processing logic determines whether acceptable credentials or authentication information (e.g., a user name and password) have been provided by the network appliance. If the method, for example, recognizes the user name and/or other associated credentials for a particular user, the credentials can be accepted. If the login request is accompanied by acceptable credentials or authentication information, then the method proceeds to block 308, where a unique identifier is sent to the network appliance. If no credentials were provided, or if unacceptable credentials were provided, then the method ends.

At block 310, a certificate signing request (CSR) is received from the network appliance. The unique identifier is typically included in the CSR, although a separate communication can be used. The CSR may have been automatically generated by the network appliance upon login of the user when the network appliance has no signed certificate.

At block 312, processing logic determines whether the unique identifier in the CSR is valid. The processing logic can determine if the CSR is valid by, for example, comparing the received ID with the sent ID and the IP address to which the ID was sent with the IP address of the sender of the CSR. If the unique identifier in the CSR is not valid, the method proceeds to block 330, where the network appliance is notified that the network appliance could not be activated. When the unique identifier is valid, the method proceeds to block 316.

At block 316, time information is compared to determine whether the activation of the network appliance is timely. The time information can be a timestamp of the CSR, revision number of software in the client, and the like. If the transaction has expired, the method proceeds to block 330. If the transaction has not expired, the method proceeds to block 318. The transaction may be considered expired if, for example, the timestamp of the CSR is close to a timestamp generated at the time of providing the unique ID (e.g., exceeds it by more than a predefined threshold). The server can also consider the timing of the request that includes the CSR in making an expiry determination.

At block 318, processing logic optionally determines whether data within the CSR (such as whether the user credentials have a corresponding entry in a database) indicates whether the user is authorized to receive an identity certificate. If the data in the CSR indicates the client is authorized, the method proceeds to block 320, where the identity certificate is signed. Otherwise, the method proceeds to block 330, where the client is notified that the network appliance could not be activated. If the identity certificate is signed, the certificate is transmitted to the network appliance at block 340. The method then ends. Thereafter, the network appliance may authenticate itself using the signed certificate.

Once the identity certificate has been sent to the network appliance, the network appliance may be automatically configured. In one embodiment, configuration information specific to the network appliance is associated with the signed certificate. Therefore, for example, if an update for the network appliance is available, the update may be provided to the network appliance automatically once the network appliance authenticates itself using the signed certificate.

Figure 4:
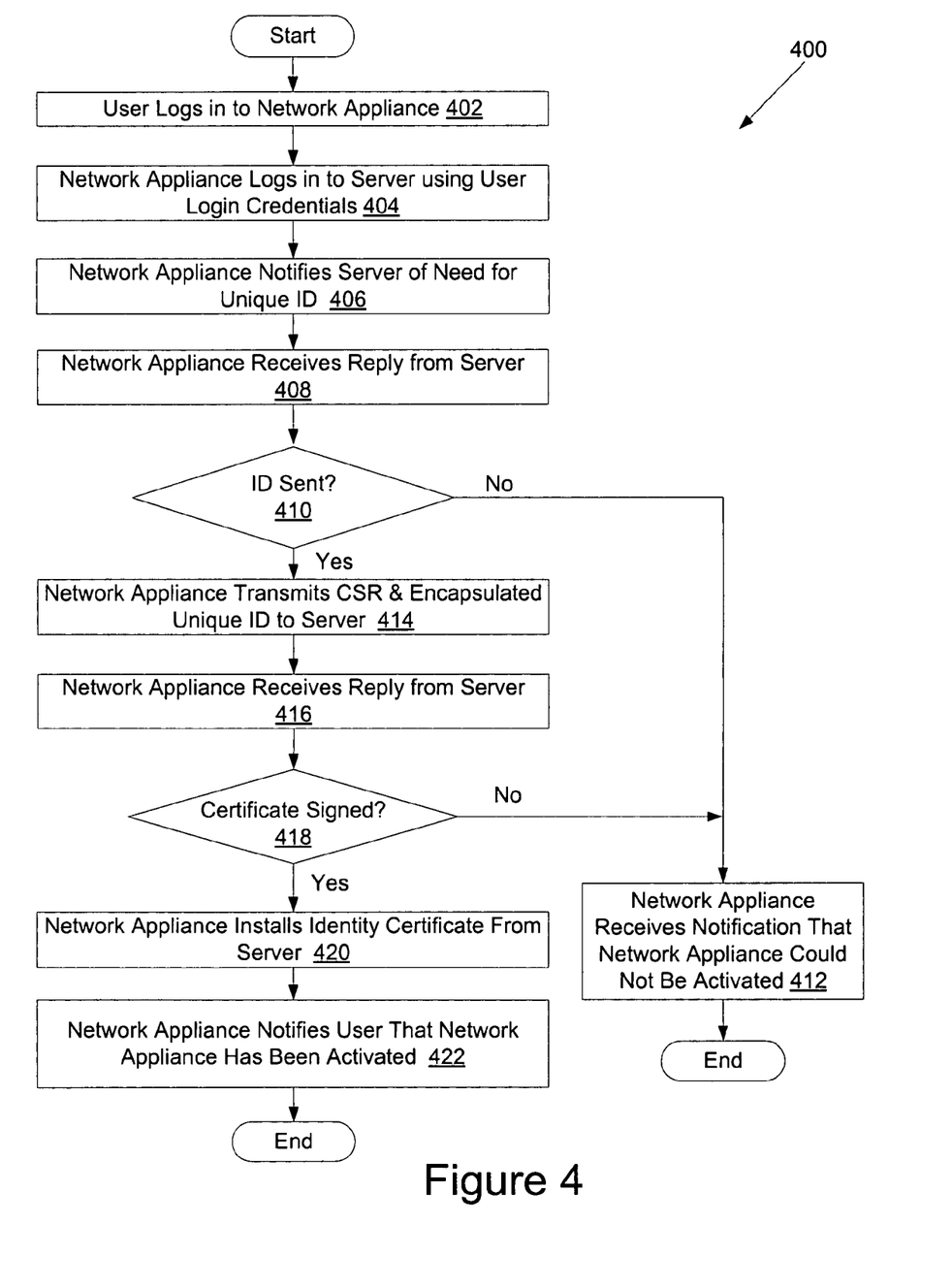
FIG. 4 is a flow diagram illustrating another embodiment of a method for activating a network appliance.

FIG. 4 is a flow diagram illustrating another embodiment of a method 400 for activating a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by devices in a customer network, such as customer network 135 of FIG. 1A, customer network 152 of FIG. 1B, or customer network 250 of FIG. 2.

Referring to FIG. 4, method 400 begins with receiving login information from a user (block 402). The login information may include credentials or authentication information (e.g., a user name and password and/or biometric identification).

At block 404, the network appliance logs in to the server of the service provider. At block 406, the network appliance optionally notifies the server of the need to be initialized. In another embodiment, the server can determine that the network appliance needs to be initialized by, for example, examining IP addresses of communications, the supplied login credentials, and the like. At block 408, the network appliance receives a reply from the server. If a unique identifier has been sent by the server, processing continues at block 414. If a unique identifier has not been sent, processing continues at block 412, then the network appliance cannot be activated.

At block 414 the network appliance transmits the CSR and (optionally) encapsulated unique identifier received from the server back to the server to request activation for a network appliance. The server evaluates information contained in the request to determine whether to sign the CSR. The server evaluates whether the identifier is valid (as described in FIG. 3). If so, the server may decide to grant the request and send the signed certificate to the network appliance. In block 416, the network appliance receives the server's reply indicating a status of the CSR request.

In block 418, if the certificate is not signed, the processing continues at block 412 where the network appliance is notified of the failure. If the certificate is signed, the processing continues at block 420.

At block 420, the network appliance installs the identity certificate received from the server. The network appliance may also receive a notification that includes a redirect to a provisioning URL. At block 442, the network appliance notifies the user that the network appliance has been successfully activated.

Figure 5:
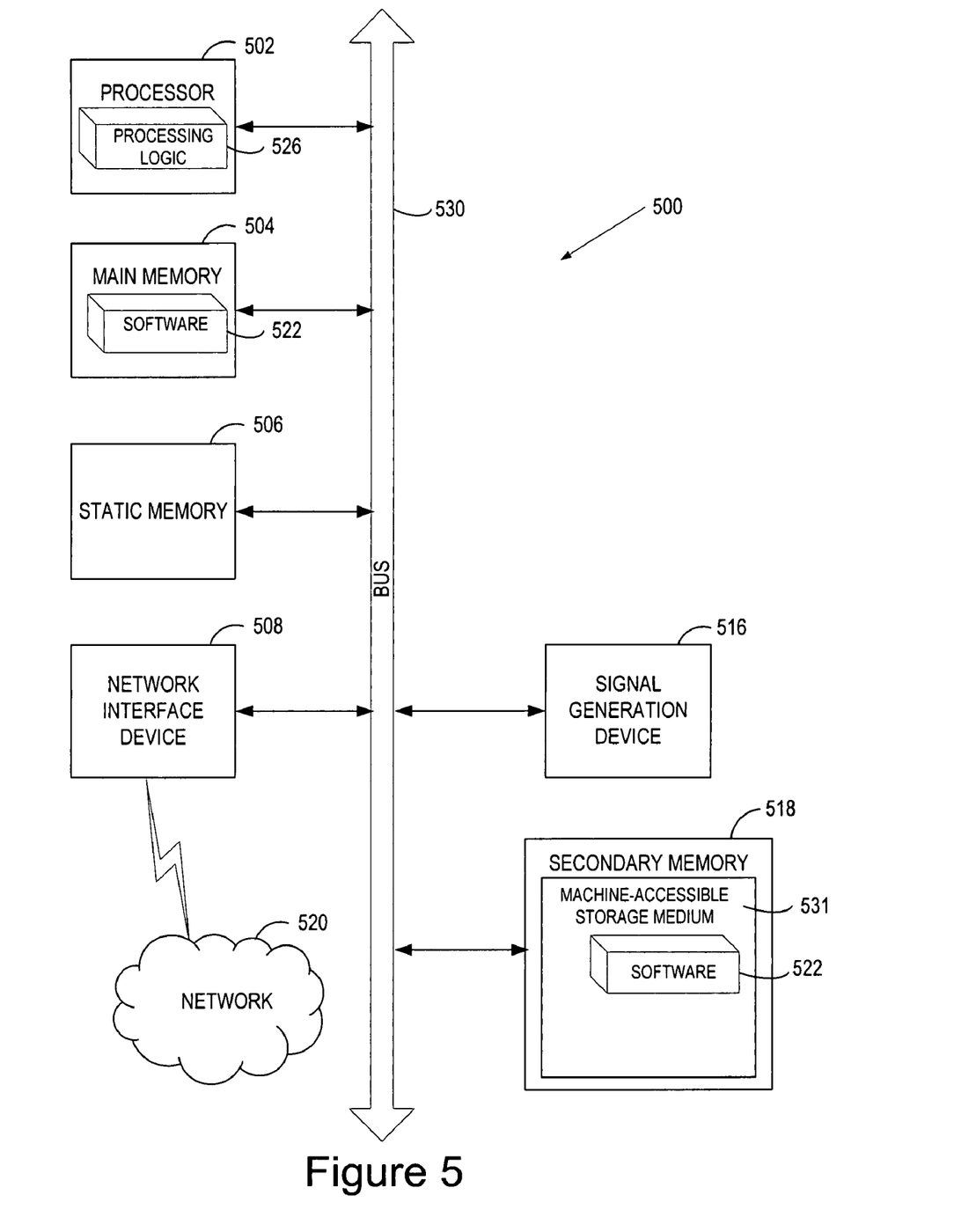
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115, a back end server 125, a client 105, a network appliance 110, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
   determining that a network appliance is not initialized; and
   initializing the network appliance without user input, the initializing comprising:
   logging on to a server;
   receiving from the server a unique identifier at the network appliance for identifying the network appliance;
   generating a digital certificate signing request (CSR) by the network appliance;
   sending the CSR and the unique identifier to the server with a timestamp;
   receiving a signed certificate from the server at the network appliance, wherein the signed certificate was generated by the server in response to the server evaluating the CSR to determine that the timestamp has not expired and to verify a location of the network appliance, the location including an IP address; and
   initializing the network appliance using the received signed certificate.

2. The method of claim 1 further comprising receiving a user login having user credentials at the network appliance, wherein the user credentials comprise identifying information and authenticating information.

3. The method of claim 1, wherein the server has compared the unique identifier sent to the network appliance with the unique identifier sent by the network appliance to determine whether to send the signed certificate to the network appliance.

4. The method of claim 1, wherein determining that the network appliance is not initialized comprises evaluating whether the network appliance has a signed certificate.

5. A computer implemented method, comprising:
   determining whether a network appliance possesses a signed certificate from a service provider; and
   initializing the network appliance without user input, the initializing comprising:
   if the network appliance does not have a signed certificate, logging into the service provider using login credentials and requesting activation, and in response, receiving from the service provider, at the network appliance, a unique identifier for identifying the network appliance;
   generating a digital certificate signing request (CSR) by the network appliance that includes the received unique identifier and that further includes time information;
   sending the CSR, the time information and the unique identifier to the service provider to determine whether the network appliance is to be activated; and
   in response to receiving a signed certificate, initializing the network appliance, wherein the signed certificate was generated by the service provider in response to the service provider evaluating the CSR to determine that the time information shows that the CSR was timely received and to verify a location of the network appliance, the location including an IP address.

6. The method of claim 5, wherein the CSR is associated with user credentials of a user who has logged into the network appliance.

7. The method of claim 6, further comprising sending a notification message to the user that the network appliance has been activated.

8. The method of claim 5, wherein the signed certificate has been evaluated to determine whether the unique identifier sent in the CSR is the same as the unique identifier sent by the service provider, and in response, the signed certificate is signed.

9. The method of claim 5, wherein the CSR includes configuration information or credential information for the network appliance.

10. A non-transitory machine-accessible medium including instructions that, when executed by a first machine, cause the first machine to perform a computer implemented method comprising:
   determining that a network appliance is not initialized; and
   initializing the network appliance without user input, the initializing comprising:
      requesting and receiving a unique identifier from a service provider for identifying the network appliance;
      generating a certificate signing request (CSR);
      sending the CSR, a timestamp and the received unique identifier to the service provider;
      receiving a signed certificate from the service provider at the network appliance, wherein the signed certificate was generated by the service provider in response to the service provider evaluating the CSR to determine that the timestamp has not expired and to verify a location of the network appliance, the location including an IP address; and
      initializing the network appliance using the received signed certificate.

11. The non-transitory machine-accessible medium of claim 10, further comprising receiving credential information of a user logged into the network appliance.

12. The non-transitory machine-accessible medium of claim 10, wherein the unique identifier is encapsulated within the CSR.

13. The non-transitory machine-accessible medium of claim 10, wherein the certificate signing request has been automatically generated by the network appliance upon a user logging into the network appliance and subsequently logging into the service provider.

14. The non-transitory machine-accessible medium of claim 10, further including instructions that, when executed by a second machine, cause the second machine to perform a computer implemented method comprising:
   comparing whether the unique identifier sent to the network appliance is the same as the unique identifier sent by the network appliance before signing the certificate.

15. The non-transitory machine-accessible medium of claim 14, the method further comprising:
   signing the signed certificate in response to validating credential information of a user logged in at the network appliance.

16. A computing system, comprising:
   a data store to store a signed certificate of a network appliance; and
   a processing device, coupled to the data store, wherein the processing device is configured to:
      receive a user login for the network appliance;
      receive credentials for logging on to a service provider;
      determine whether the signed certificate exists on the network appliance; and
      obtain the signed certificate without user input, the obtaining comprising:
         in response to determining that the signed certificate does not exist on the network appliance, requesting and receiving a unique identifier from the service provider,
         generating a certificate signing request (CSR),
         sending the CSR and the unique identifier to the service provider with time information, and
         receiving the signed certificate from the service provider, wherein the signed certificate was generated by the service provider in response to the service provider evaluating the CSR to determine that the time information shows that the CSR was timely received and to verify a location of the network appliance, the location including an IP address.

17. The system of claim 16 further comprising:
   the service provider networked with the network appliance, to receive the CSR from the network appliance, the CSR including the received unique identifier, and to sign a certificate for the network appliance if the unique identifier in the CSR is derived from the unique identifier sent by the service provider.

18. The computing system of claim 16, further comprising:
   a client networked with the network appliance to permit a user to login to the network appliance.

19. The computing system of claim 16, wherein the unique identifier is known by the service provider before a request is received for the unique identifier.

* * * * *